(12) United States Patent
Amano et al.

(10) Patent No.: US 10,399,433 B2
(45) Date of Patent: Sep. 3, 2019

(54) FUEL TANK TO SUPPRESS DAMAGE UPON INPUT OF A LOAD OR DEFORMATION TO THE TANK BODY

(71) Applicant: TOYOTA JIDOSHA KABUSHIKI KAISHA, Toyota-shi (JP)

(72) Inventors: Shinsuke Amano, Okazaki (JP); Hideki Iwata, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/651,381

(22) Filed: Jul. 17, 2017

(65) Prior Publication Data

US 2018/0065475 A1    Mar. 8, 2018

(30) Foreign Application Priority Data

Sep. 8, 2016 (JP) ................................. 2016-175724

(51) Int. Cl.
*B60K 15/03* (2006.01)
*B29C 49/20* (2006.01)
(Continued)

(52) U.S. Cl.
CPC ........ *B60K 15/03* (2013.01); *B60K 15/03177* (2013.01); *B29C 49/20* (2013.01);
(Continued)

(58) Field of Classification Search
CPC .............. B60K 15/03006; B60K 15/03; B60K 15/03177; B29C 49/20; B65D 7/46; B65D 7/44
(Continued)

(56) References Cited

U.S. PATENT DOCUMENTS 254,152 A * 2/1882 O'Donnell et al. ...... B63C 7/30
441/32
1,316,600 A * 9/1919 Snyder .................. B65D 1/265
220/254.2
(Continued)

FOREIGN PATENT DOCUMENTS

DE    10 2012 009 157 A1    11/2013
JP        2014-518327             7/2014
(Continued)

OTHER PUBLICATIONS

Office Action dated Oct. 9, 2018 in co-pending U.S. Appl. No. 15/851,977.

*Primary Examiner* — Robert J Hicks
(74) *Attorney, Agent, or Firm* — Oblon, McClelland, Maier & Neustadt, L.L.P.

(57) ABSTRACT

There is provided a fuel tank including: a tank main body that stores fuel at an interior and has a pair of wall portions that face one another; and a supporting pillar that spans between the pair of wall portions, wherein the supporting pillar includes a shaft portion that is disposed with an axial direction thereof being a direction in which the pair of wall portions face one another, a pair of flange portions that extend-out toward a radial direction outer side of the shaft portion from axial direction both end portions of the shaft portion, and that are joined to the pair of wall portions, and plural ribs that are formed at a periphery of the shaft portion, and that span between the shaft portion and the pair of flange portions, and that have weak portions that are weakened locally.

8 Claims, 6 Drawing Sheets

(51) Int. Cl.
*B29L 31/00* (2006.01)
*B29K 705/00* (2006.01)
*B29K 701/00* (2006.01)

(52) U.S. Cl.
CPC .. *B29C 2049/2013* (2013.01); *B29K 2701/00* (2013.01); *B29K 2705/00* (2013.01); *B29L 2031/7172* (2013.01); *B60K 2015/03328* (2013.01); *B60K 2015/03493* (2013.01); *B60Y 2306/01* (2013.01)

(58) Field of Classification Search
USPC ....... 220/564, 563, 562, 653, 652, 651, 921, 220/918
See application file for complete search history.

(56) References Cited

U.S. PATENT DOCUMENTS

| | | | |
|---|---|---|---|
| 1,738,483 A * | 12/1929 | Raymond | E04H 7/065 220/565 |
| 3,912,103 A | 10/1975 | Gerhard | |
| 6,338,420 B1 | 1/2002 | Pachciarz et al. | |
| 2001/0019061 A1 | 9/2001 | Ettlinger | |
| 2002/0066737 A1 | 6/2002 | Stack et al. | |
| 2006/0102634 A1 | 5/2006 | Potter et al. | |
| 2012/0138606 A1 | 6/2012 | Varga | |
| 2014/0014663 A1 | 1/2014 | Eulitz et al. | |
| 2014/0110038 A1 | 4/2014 | Criel et al. | |
| 2014/0158696 A1 | 6/2014 | Criel et al. | |
| 2014/0197174 A1 | 7/2014 | Boecker et al. | |
| 2014/0305936 A1 | 10/2014 | Gebert et al. | |
| 2015/0232226 A1 | 8/2015 | Heidemeyer et al. | |
| 2016/0158992 A1 | 6/2016 | Criel et al. | |
| 2018/0194219 A1 | 7/2018 | Amano et al. | |

FOREIGN PATENT DOCUMENTS

| | | |
|---|---|---|
| JP | 2014-141248 A | 8/2014 |
| JP | 2015-604386 A | 2/2015 |
| JP | 2016-506331 A | 3/2016 |
| JP | 2016-128277 | 7/2016 |
| KR | 10-2014-0022412 A | 2/2014 |
| KR | 10-2015-0075116 A | 7/2015 |
| WO | WO 2012/139962 A1 | 10/2012 |
| WO | WO 2014/053285 A1 | 4/2014 |
| WO | WO 2014/131685 A2 | 9/2014 |
| WO | WO 2014/131686 A2 | 9/2014 |
| WO | WO 2015/032924 A1 | 3/2015 |

* cited by examiner

FUEL TANK TO SUPPRESS DAMAGE UPON INPUT OF A LOAD OR DEFORMATION TO THE TANK BODY

CROSS-REFERENCE TO RELATED APPLICATION

This application is based on and claims priority under 35 USC 119 from Japanese Patent Application No. 2016-175724 filed on Sep. 8, 2016, the disclosure of which is incorporated by reference herein.

BACKGROUND

Technical Field

The present disclosure relates to a fuel tank.

Related Art

A fuel tank made of resin is disclosed in Japanese Patent Application Laid-Open (JP-A) No. 2014-516327. In this fuel tank, a hollow pillar (a supporting pillar) that serves as a reinforcing element is bridged between wall portions, which face one another, of a fuel tank shell (a tank main body). This hollow pillar is a tube-shaped hollow body, and is joined to the aforementioned respective wall portions at flange portions that are provided at the both end portions of the hollow pillar. Deformation of the fuel tank shell is suppressed by this hollow pillar. Further, the hollow pillar is formed such that the diameter of the intermediate portion thereof is smaller than that of the regions at the both end sides.

Due thereto, at the time when a large load is inputted to the fuel tank, due to the hollow pillar breakup at the small-diameter intermediate portion thereof, damage to the fuel tank shell is suppressed.

However, in the fuel tank of the above-described structure, due to the flange portions of the hollow pillar flexing due to input from the exterior or changes in the internal pressure of the fuel tank shell at usual times, there is the possibility that the deformation of the fuel tank shell will no longer be suppressed sufficiently. Further, in order to ensure the strength of the hollow pillar at usual times, there is the need to ensure the diameters of the intermediate portion (the small-diameter weak portion) of the hollow pillar to a certain extent, and, in accordance therewith, the diameters of the both end portion sides of the hollow pillar also increase. As a result, the diameter of the hollow pillar overall becomes large, the volume that the hollow pillar occupies within the fuel tank shell increases, and there is the possibility that the tank volume of the fuel tank shell will decrease.

SUMMARY

In view of the above-described circumstances, the present disclosure provides a fuel tank that can suppress damage to a tank main body at the time of input of a large load or at the time of deformation of the tank main body at usual times, while preventing or suppressing a decrease in the tank volume.

A fuel tank of a first aspect of the present disclosure includes: a tank main body that stores fuel at an interior and has a pair of wall port sons that face one another, and a supporting pillar that spans between the pair of wall portions, wherein the supporting pillar has a shaft portion that is disposed with an axial direction thereof being a direction in which the pair of wall portions face one another, a pair of flange portions that extend-out toward a radial direction outer side of the shaft portion from axial direction both end portions of the shaft portion, and that are joined to the pair of wall portions, and plural ribs that are formed at a periphery of the shaft portion, and that span between the shaft portion and the pair of flange portions, and that have weak portions that are weakened locally.

In accordance with the fuel tank of the first aspect of the present disclosure, deformation of the tank main body that accompanies flexing of the flange portions can be suppressed due us flexing of the pair of flange portions of the supporting pillar, with respect to input from the exterior or changes in internal pressure of the tank main body at usual times, being suppressed by the plural ribs. Further, at the time when a large load is inputted, due to the supporting pillar breaking with the weak portions of the ribs being the starting point, the wall portions of the tank main body being damaged in vicinities of the portions that are joined to the flange portions can be suppressed. Moreover, because the weak portions that are the starting point of breaking are provided at the ribs, the shaft portion can overall be made to be compact while the strength of the shaft portion at usual times is maintained, as compared with a structure in which weak portions are formed in the shaft portion. As a result, a decrease in the tank volume of the tank main body can be prevented or suppressed.

In a fuel tank of a second aspect of the present disclosure, in the first aspect, the weak portions are cut-out portions that are formed by portions of the ribs being recessed locally toward the shall portion side.

In accordance with the fuel tank of the second aspect of the present disclosure, the ribs are weakened locally due to cut-out portions such as those described above being formed in portions of the ribs. Due thereto, the weak portions of the ribs can be made to be simple structures.

In a fuel tank of a third aspect of the present disclosure, in the second aspect, the cut-out portions extend to an outer peripheral surface of the shaft portion.

Because the fuel tank of the third aspect of the present disclosure is structured as described above, as the time when a large load is inputted, the shaft portion of the supporting pillar breaks with the places, at which the cut-out portions of the ribs extend to the outer peripheral surface, being the starting point. Because the ribs are not formed at these places, foe breakage load of the supporting pillar can be set by the shall portion only. Due thereto, setting of the breakage load is easy.

In a fuel tank of a fourth aspect of the present disclosure, in the second or third aspect, a dimension, in the axial direction, of the cut-out portions becomes smaller the further toward the shaft portion side.

In accordance with the fuel tank of the fourth aspect of the present disclosure, the dimension, in the axial direction of the shaft portion, of the cut-out portions that are formed in the ribs of the supporting pillar becomes smaller the further toward the shaft portion side of the supporting pillar. Therefore, at the time when a large load is inputted, stress can be made to concentrate at the narrow region of the shaft portion. Due thereto, the shaft portion can be easily broken from the place that was set to be broken.

In a fuel tank of a fifth aspect of the present disclosure, in any one of the first through fourth aspects, a dimension, in a radial direction of the shaft portion, of the ribs becomes smaller the further toward the weak portion side front the pair of flange portions.

In accordance with the fuel tank of the fifth aspect of the present disclosure, the ribs of the supporting pillar are formed as described above. Therefore, the ribs can be made to be small while the effect of suppressing flexing of the pair of flange portions by the ribs is ensured sufficiently. As a result, this contributes even more to the effect of preventing or suppressing a decrease in the tank volume.

A fuel tank of a sixth aspect of the present disclosure includes: a tank main body that stores fuel at an interior and has a pair of wall portions that face one another; and a supporting pillar that spans between the pair of wall portions, wherein the supporting pillar has a shaft portion that is disposed with an axial direction thereof being a direction in which the pair of wall portions face one another, a pair of flange portions that extend-out toward a radial direction outer side of the shaft portion from axial direction both end portions of the shall portion, and that are joined to the pair of wall portions, plural one side ribs that are formed at a periphery of the shaft portion at an axial direction one side of the shaft portion, and that span between the shaft portion and one of the pair of flange portions, and plural other side ribs that are formed at the periphery of the shaft portion at an axial direction other side of the shaft portion, and that span between the shaft portion and another of the pair of flange portions.

In accordance with the fuel tank of the sixth aspect of the present disclosure deformation of the tank main body that accompanies flexing of the flange portions can be suppressed due to flexing of the pair of flange portions of the supporting pillar, with respect to input front the exterior or changes in internal pressure of the tank main body at usual times, being suppressed by the plural one side ribs and other side ribs. Further, at the time when a large load is inputted, due to the supporting pillar breaking with the places, which are between the one side ribs and the other side ribs, at the shaft portion being the starting point, the wall portions of the tank main body being damaged in vicinities of the portions that cue joined to the flange portions can be suppressed. Moreover, the shaft portion can overall be made to be compact while the strength of the shaft portion at usual times is maintained, as compared with a structure in which weak portions are provided in the shaft portion itself (e.g., a structure in which the axial direction intermediate portion of the shaft portion is formed to a smaller diameter than the axial direction both end sides thereof). As a result, a decrease in the tank volume of the tank main body can be prevented or suppressed.

As described above, its accordance with the fuel tank relating to the present disclosure, damage to a tank main body at the time of input of large load or deformation of the tank main body at usual times can be suppressed, while a decrease in the tank volume is prevented or suppressed.

BRIEF DESCRIPTION OF THE DRAWINGS

Exemplary embodiments of the present disclosure will be described in detail based on the following figures, wherein.

DETAILED DESCRIPTION

A fuel tank 10 relating to an embodiment of the present disclosure is described by using FIG. 1 through FIG. 5. Note that the respective drawings are schematic, and illustration of structures with little relation to the present disclosure is omitted. Further arrow FR that is shown appropriately in the respective drawings indicates the vehicle front side, arrow W indicates the vehicle transverse direction, and arrow UP indicates the vehicle upper side. Hereinafter, when description is given merely by using the vertical direction, it refers to the vertical of the vehicle vertical direction. Further, there are cases in which some of the reference numerals are omitted in the respective drawings, in order to make the drawings easier to view.

(Structure)

Figure 1:
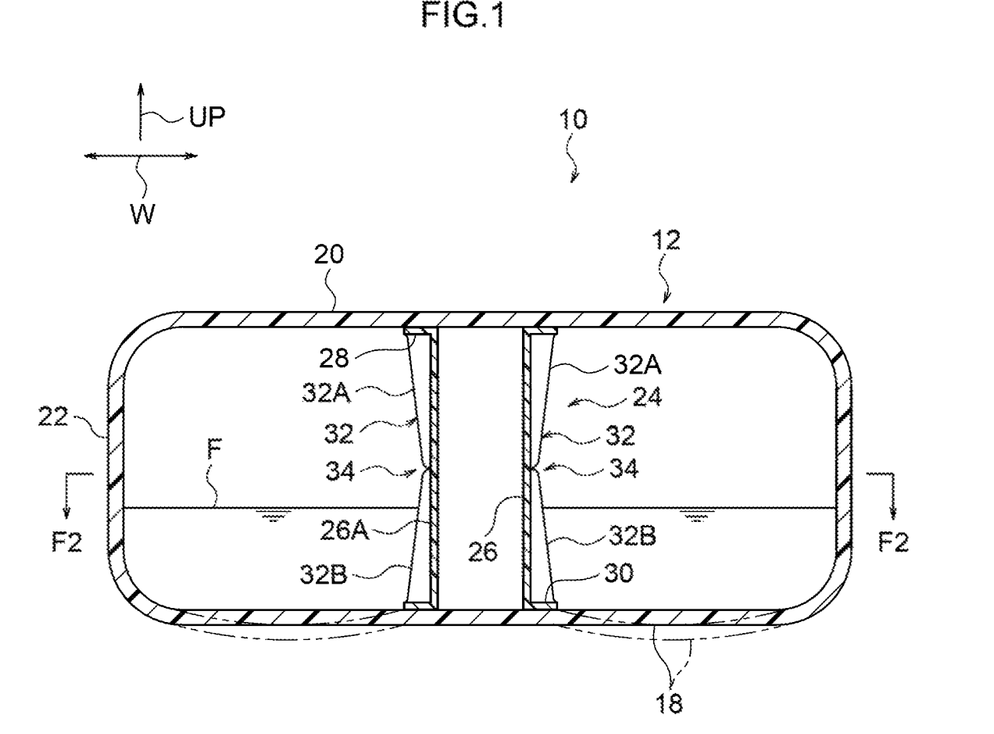
FIG. 1 is a vertical sectional view of a fuel tank relating to an embodiment of the present disclosure, and is a drawing showing a cut cross-section corresponding to line F1-F1 of FIG. 2.
Figure 2:
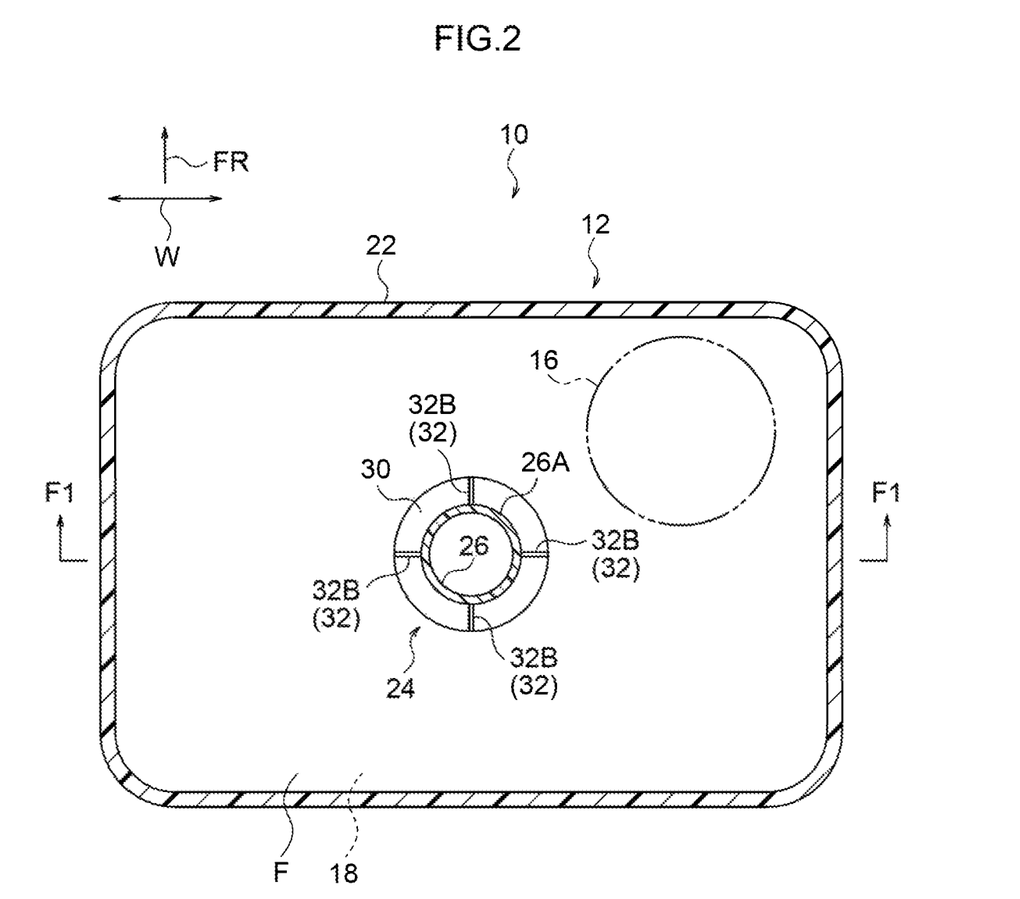
FIG. 2 is a lateral sectional view of the fuel tank, and is a drawing showing a cut cross-section corresponding to line F2-F2 of FIG. 1.
Figure 3:
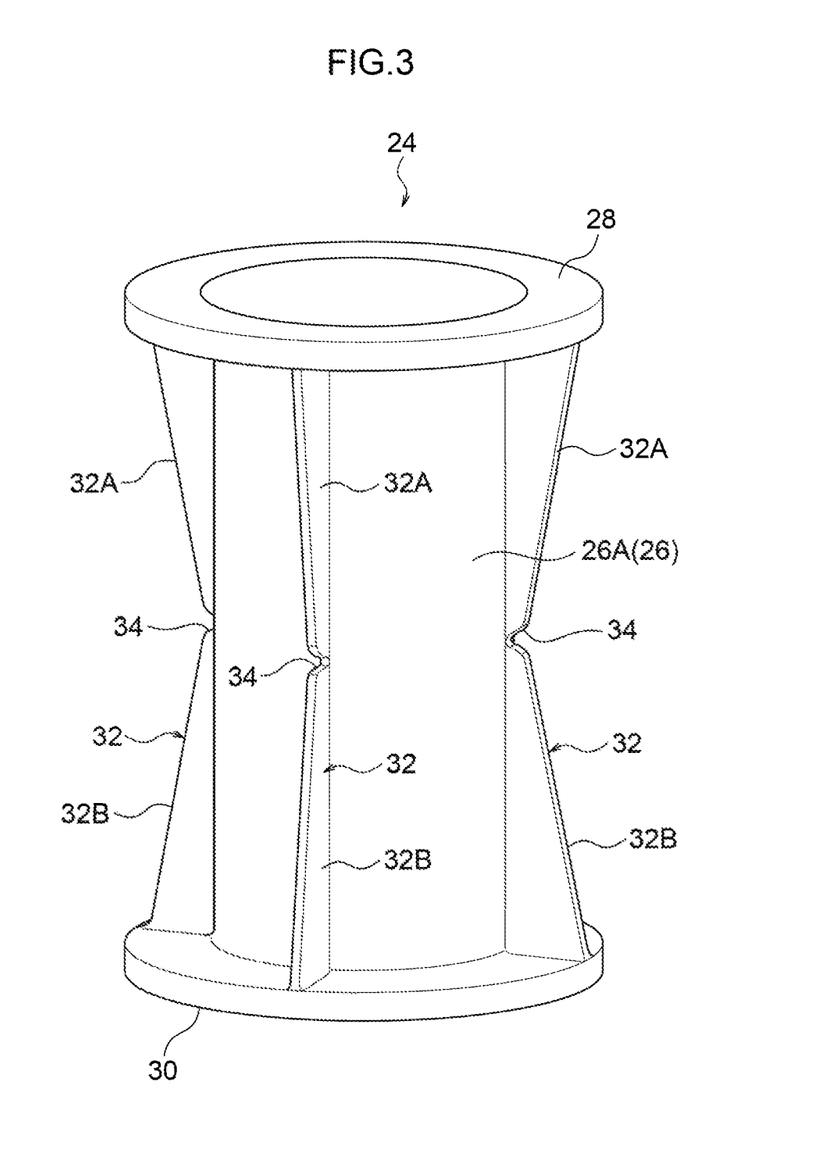
FIG. 3 is a perspective view of a supporting pillar that is a structural member of the fuel tank.
Figure 4:
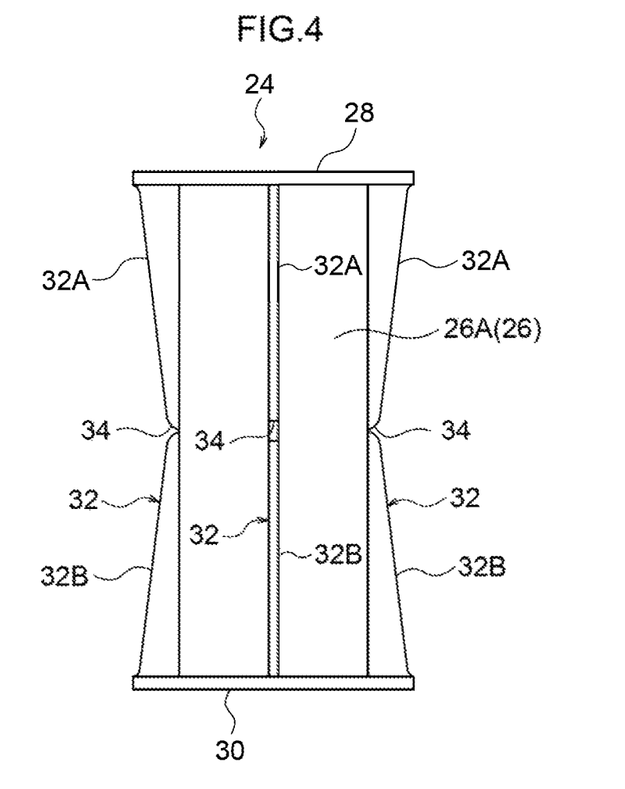
FIG. 4 is a side view of the supporting pillar.
Figure 5:
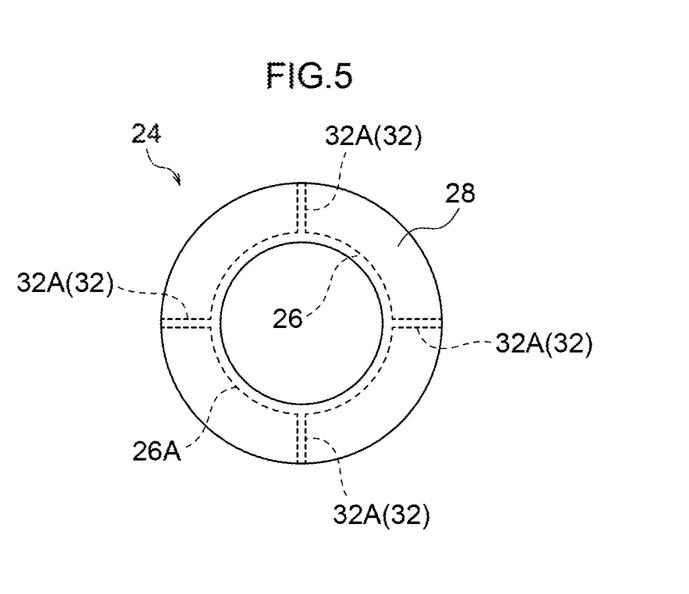
FIG. 5 is a plan view of the supporting pillar.

As shown in FIG. 1 and FIG. 2, the fuel tank 10 relating to the present embodiment has a tank main body 12 that is made of resin and stores fuel F at the interior thereof, and a built-in supporting pillar 24 that is made of resin and is disposed at the interior of the tank main body 12. This built-in supporting pillar 24 corresponds to the "supporting pillar" relating to the present disclosure. Note that, in FIG. 2, reference numeral 16 denotes a pump module.

As shown in FIG. 1, the tank main body 12 has a bottom wall 18 and a top wall 20 that are a pair of wall portions that face one another in the vehicle vertical direction, and side walls 22 that connect the outer peripheral edge portions of the bottom wall 18 and the top wall 20 in the vehicle vertical direction. The tank main body 12 is formed substantially in the shape of a rectangular parallelepiped that is hollow.

The built-in supporting pillar 24 is disposed at the interior of the tank main body 12, and spans between the bottom wall 18 and the top wall 20. This built-in supporting pillar is disposed at the center of the tank main body 12, as seen in a plan slew of the fuel tank 10. Note that, in the present embodiment, only the one built-in supporting pillar 24 is disposed within the tank main body 12, but the present disclosure is not limited to this. In a case in which the tank main body 12 is large, or the like, these is a structure in which plural built-in supporting pillars 24 are disposed within the tank main body 12.

The dimension of the built-in supporting pillar 24 along the direction in which the top wall 20 and the bottom wall 18 face one another is set to be equal to the interval between the top wall 20 and the bottom wall 18. The built-in supporting pillar 24 integrally has a shaft portion an upper flange portion 28 and a lower flange portion 30 that are a pair of flange portions, and plural (here, four) ribs 32.

The shaft portion 26 is formed in the shape of a cylindrical tube, and is disposed with the axial direction thereof being the direction in which the bottom wall 18 and the top wall 20 face one another. The axial direction dimension of the shaft portion 26 is set to be equal to the interval between the top wall 20 and the bottom wall 18. The upper flange portion 28 is provided at an axial direction one end portion (the upper end portion) of the shall portion 26, and the lower flange portion 30 is provided at the axial direction other end portion (the lower end portion) of the shaft portion 26.

The upper flange portion 28 extends-out integrally from the upper end portion of the shaft portion 26 toward the radial direction outer side of the shaft portion 26. The lower flange portion 30 extends-out integrally from the lower end portion of the shaft portion 26 toward the radial direction outer side of the shaft portion 26. As seen from the axial direction of the shaft portion 20, the upper flange portion 28 and the lower flange portion 30 are formed in the shapes of rings that have circular inner peripheries and outer peripheries, and are shaped as plates whose plate thickness directions are the axial direction of the shaft portion 26. The inner peripheries of the upper flange portion 28 and the lower flange portion 30 are continuous with the inner periphery of the shaft portion 26.

The plural ribs 32 are formed at the periphery of the shaft portion 26, and are bridged (span) integrally between the shaft portion 26 and the upper flange portion 28 and the lower flange portion 30. As seen from the axial direction of the shaft portion 26, these plural ribs 32 project-out in a radial form from an outer peripheral surface 26A of the shaft portion 26, and are lined-up at uniform intervals in the peripheral direction of the shaft portion 26. The plural ribs 32 are formed in the shapes of plates whose plate thickness directions are the peripheral direction of the shaft portion 26, and extend in the axial direction of the shaft portion 26. The further toward the axial direction central side of the shaft portion 26, the smaller the dimension, in the radial direction of the shaft portion 26, of these plural ribs 32 (the smaller the height of projecting-out from the shaft portion 26). As seen from the peripheral direction of the shaft portion 26, the ribs 32 are formed in substantially trapezoidal shapes (substantially triangular shapes) that are elongated in the axial direction of the shaft portion 26.

A cut-out portion 34 that serves as a weak portion is formed in each of the ribs 32 at a position corresponding to the central portion of the shaft portion 26 in the axial direction of the shaft portion 26. At each of the cut-out portions 34, a portion of the rib 32 is formed so as to be recessed-in locally toward the shaft portion 26 side, and the end portion at the shaft portion 26 side is formed in an arc shape that is convex toward the shall portion 26 side. The further toward the shaft portion 26 side, the smaller the dimension, in the axial direction of the shaft portion 26, of the cut-out portion 34, and the cut-out portion 34 is formed in a substantially triangular shape as seen front the peripheral direction of the shaft portion 26. Further, the cut-out portions 34 extend to the outer peripheral surface 26A of the shaft portion 26.

Namely, each of the ribs 32 is divided by the cut-out portion 34 into a one side rib 32A that is positioned at an axial direction one side (the upper portion side) of the shaft portion 26 and another side rib 32B that is positioned at the axial direction other side (the lower portion side) of the shah portion 26. The plural one side ribs 32A are formed at the periphery of the shaft portion 26 at the axial direction one side of the shaft portion 26, and span between the upper flange portion 28 and the shaft portion 26. The plural other side ribs 32B are formed at the periphery of the shaft portion 36 at the axial direction other side of the shaft portion 26, and span between the lower flange portion 36 and the shaft portion 26.

Note that, at the built-in supporting pillar 24 of the above-described structure, one or plural fuel holes (small holes), which are not illustrated and which are for allowing the fuel F to flow into the outer side of the shaft portion 26, are formed in the lower end portion of the shaft portion 26 at slightly farther toward the upper side than the lower flange portion 30. Further one or plural air vent holes (small holes), which are for discharging air that is within the shaft portion 26 at the time when the fuel P flows-into the inner side of the shaft portion 26, are formed in the upper end portion of the shaft portion 26 at slightly further toward the lower side than the upper flange portion 28. Due thereto, there is a structure in which the hater side of the shaft portion 26 also can be utilized as a space for storing fuel. Further small ribs for reinforcement, which are not illustrated and which span between the lower flange portion 30 and the shaft portion 26, are formed in vicinities of the aforementioned fuel holes, and small ribs for reinforcement, which are not illustrated and which span between the upper flange portion 28 and the shaft portion 26, are formed in vicinities of the aforementioned air vent holes. This is a manure in which the decrease in the strength of the shaft portion 26 in the vicinities of the fuel holes and in the vicinities of the air vent holes is compensated for by these small ribs.

The top surface of the upper flange portion 28 of the built-in supporting pillar 24 that has the above-described structure is joined to the bottom surface of the top wall 20 of the tank main body 12 by means such as welding or the like, and Use bottom surface of the lower Range portion is joined to the top surface of the bottom wall 18 of the tank main body 12 by means such as welding or the like. Due thereto, the built-in supporting pillar 24 is fixed to the interior of the tank main body 12.

Note that, at the time of molding the fuel tank 10, for example, first, the lower flange portion 30 of the built-in supporting pillar 24 is welded to a sheet body of molten resin that is shaped at a lower mold. Then, by closing an upper mold and the lower mold, the upper flange portion 28 of the built-in supporting pillar 24 is welded to a sheet body of molten resin that is shaped at the upper mold. In this way, there is a structure in which the built-in supporting pillar 24 is welded to the bottom wall 18 and the top wall 20 of the fuel tank 10.

(Operation and Effects)

Operation and effects of the present embodiment are described next.

At the fuel tank 10 of the above-described structure, when the internal pressure of the tank main body 12 fluctuates, the tank main body 12 deforms. For example, when, due to a rise in air temperature, or the like, the internal pressure of the tank main body 12 rises, the tank main body 12 expands. At this time, the bottom wall 18, to which the weight of the fuel F is being applied, deforms the most (refer to the two-dot chain line in FIG. 1). With regard to this point, in the present embodiment, because the built-in supporting pillar 24 spans between the top wall 20 and the bottom wall 18 of the tank main body 12, deformation of the tank main body 12 is suppressed. In particular, at the portion to which the built-in supporting pillar 24 is joined, fluctuations in the interval between the bottom wall 18 and the top wall 20 are prevented or suppressed effectively.

Further, in the present embodiment, because the built-in supporting pillar 24 has the upper flange portion 28 and the lower flange portion 30, the welded surface area of the built-in supporting pillar 24 and the bottom wall 18 and the top wall 20 of the tank main body 12 can be enlarged, as compared with a structure in which the built-in supporting pillar 24 does not have the upper flange portion 28 and the lower flange portion 30. As a result, the welded strength of the built-in supporting pillar 24 and the tank main body 12 can be ensured to be good, and deformation of the tank main body 12 at usual times can be suppressed effectively.

Furthermore, flexure of the upper flange portion 28 and the lower flange portion 30 of the built-in supporting pillar 24, with respect to input from the exterior or fluctuations in internal pressure of the tank main body 12 at usual times, is suppressed by the plural ribs 32 (the one side ribs 32A and the other side ribs 32B). Due thereto, deformation of the tank main body 12, which accompanies flexing of the upper flange portion 28 and the lower flange portion 30, can be suppressed effectively.

Further, at the time when a large load is inputted to the fuel tank 10 due to, for example, a collision of the vehicle or the like, the built-in supporting pillar 24 breaks with the cut-out portions 34 of the ribs 32 being the starting point. Due thereto, the top wall 20 and the bottom wall 18 of the tank main body 12 being damaged in vicinities of the joined portions of the upper flange portion 28 and the lower flange portion 30 can be suppressed. As a result, the risk of a fuel leak from the tank main body 12 due to such damage can be lowered.

Furthermore, because the cut-out portions 34 (weak portions) that are the starting point of breakage are provided at the ribs the shaft portion 26 can be made to be compact on the whole while the strength of the shaft portion 26 usual times is ensured, as compared with a structure in which weak portions are formed in the shaft portion 26 (for example, a structure in which the axial direction intermediate portion of the shaft portion 26 is formed to have a smaller diameter than the axial direction both end sides thereof). As a result, a decease in the tank volume of the tank main body 12 can be prevented or suppressed.

Moreover, in the present embodiment, the ribs 32 are weakened locally due to portions of the ribs 32 being recessed locally toward the shaft portion 26 side and the cut-out portions 34 being formed. Due thereto, the weak portions of the ribs 32 can be made to be simple structures.

Further, in the present embodiment, the cut-out portions 34 of the ribs 32 extend to the outer peripheral surface 26A of the shaft portion 26. Therefore, at the time when a large load is inputted to the fuel tank 10, the shaft portion 26 of the built-in supporting pillar 24 breaks with the places at which the cut-out portions 34 of the ribs 32 extend to the outer peripheral surface 26A, being the starting point. Because the ribs 32 are not formed at these places, the breakage load of the built-in supporting pillar 24 can be set by the shaft portion 26 only. Due thereto, setting of the breakage load is easy.

Further, in the present embodiment, the dimension, in the axial direction of the shaft portion 26, of the cut-out portion 34 becomes smaller the further toward the shaft portion 26 side. Therefore, at the time when a large load is inputted to the fuel tank 10, stress can be made to concentrate at the region where the shaft portion 26 is narrow. Due thereto, the shaft portion 26 can be broken easily from the place that was set to be broken.

Further, in the present embodiment, the dimension, in the radial direction of the shaft portion 26, of the ribs 32 becomes smaller the further toward the cut-out portion 34 sides from the upper flange portion 28 and the lower flange portion 30. Due thereto, the ribs 32 can be made to be small while the effect of suppressing flexing of the upper flange portion 28 and the lower flange portion 30 by the ribs 32 is ensured sufficiently. As a result, this contributes even more to the effect of preventing or suppressing a decrease in the tank volume of the tank main body 12.

<Supplemental Explanation of Embodiment>

Figure 6:
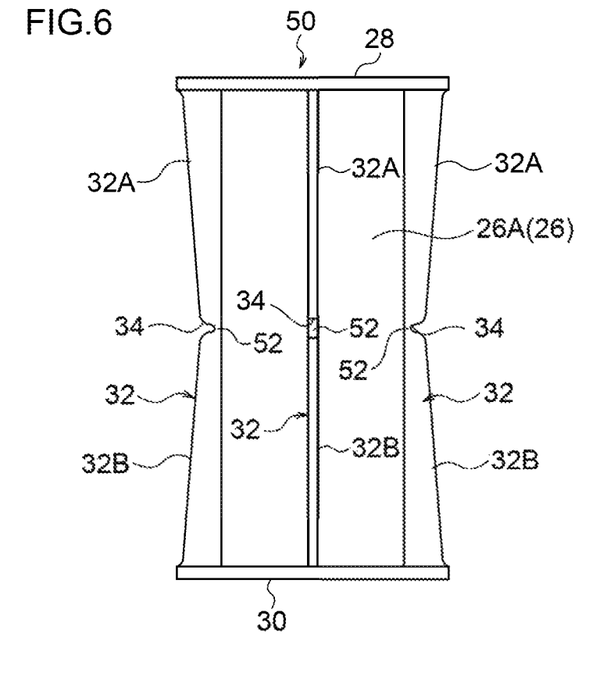
FIG. 6 is a side view showing a first modified example of the supporting pillar.

Note that the above-described embodiment is structured such that the cut-out portions 34 of the ribs extend to the outer peripheral surface of the shaft portion 26, but the present disclosure is not limited to this. As with built-in supporting pillar 50 (a first modified example) that is shown in FIG. 6, there may be a structure in which the cut-out portions 34 do not extend to the outer peripheral surface 26A of the shaft portion 26. At this built-in supporting pillar 50, the one side ribs 32A and the other side ribs 32B are not divided by the cut-out portions 34, and are connected via narrow-width portions 52 that have narrow widths in this first modified example 50, the breakage load of the built-in supporting pillar 24 cannot be set by the shaft portion 26 only, but, other than this point, operation and effects that are similar to those of the above-described embodiments are obtained.

Figure 7:
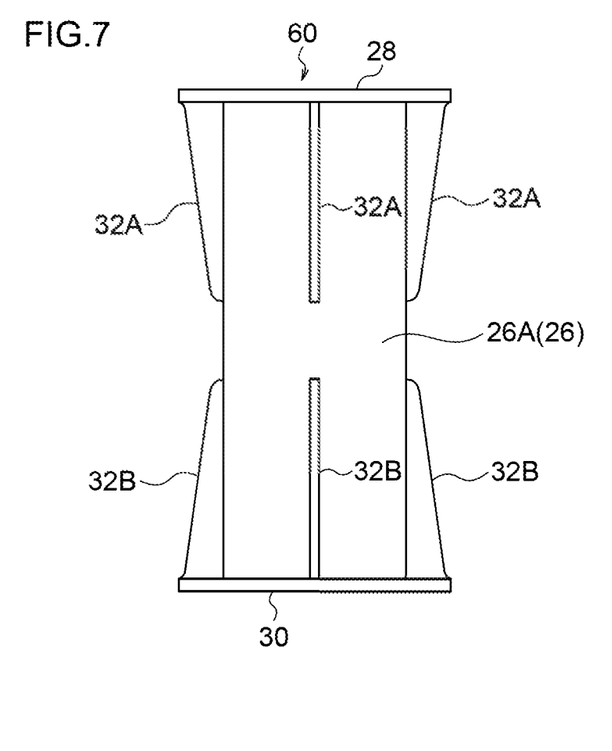
FIG. 7 is a side view showing a second modified example of the supporting pillar.

Further, the above-described embodiment is structured such that the cut-out portions 34 are termed in the ribs 32, but the present disclosure is not limited to this. For example, as with a built-in supporting pillar 60 (a second modified example) that is shown in FIG. 7, there may be a structure in which the one side ribs 32A and the other side ribs 32B are formed so as to be separate in the axial direction of the shaft portion 26. At this built-in supporting pillar 60, at the time of input of a large load, the built-in supporting pillar 60 breaks with the place which is between the one side ribs 32A and the other side ribs 32B at the shaft portion 26, being the starting point. Note that, at this built-in supporting pillar 60, there may be a structure in which the one side ribs 32A and the other side ribs 32B are disposed so as to be offset in the peripheral direction of the shaft portion 26.

Figure 8:
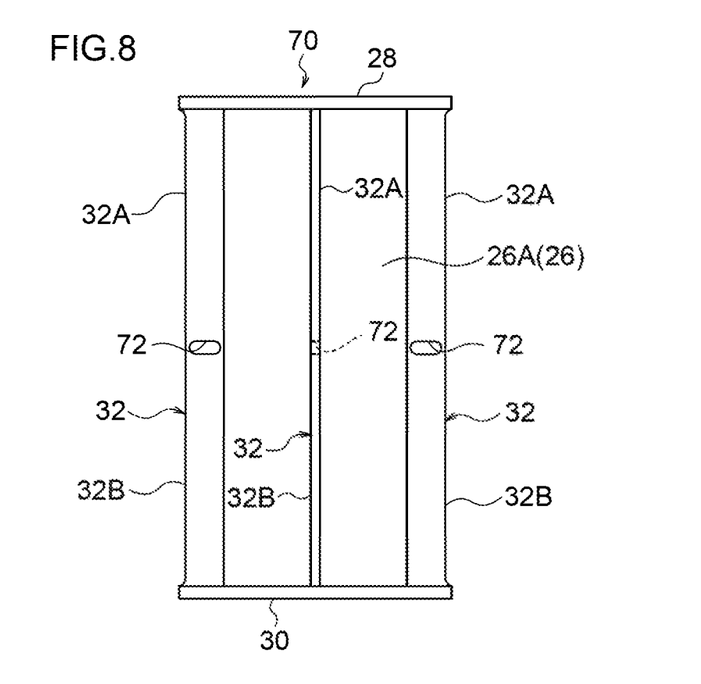
FIG. 8 is a side view showing a third modified example of the supporting pillar.
Figure 9:
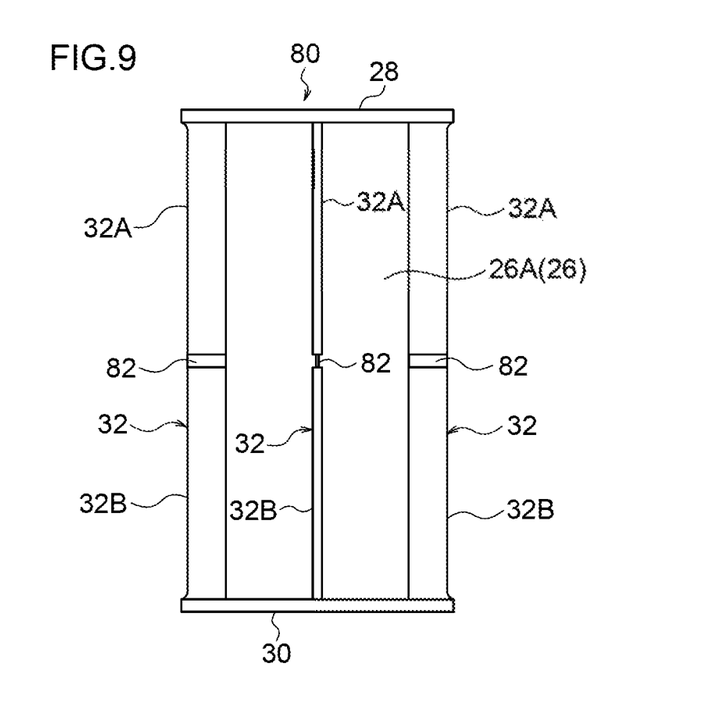
FIG. 9 is a side view showing a fourth modified example of the supporting pillar.

Further, the above-described embodiment is a structure in which the weak portions of the ribs 32 are made to be the cut-out portions 34. However, the present disclosure is not limited to this, for example, as with a built-in supporting pillar 70 (a third modified example) that is shown in FIG. 8, there may be a structure in which holes 72 that serve as weak portions are formed in the ribs 32 instead of the cut-out portions 34. Further, for example, as with a built-in supporting pillar 80 (a fourth modified example) that is shown in FIG. 9, there may be a structure in which thin-walled portions 82 that serve as weak portions are formed in the ribs 32 instead of the cut-out portions 34.

Moreover, although the above-described embodiment is a structure in which the shall portion 26 is formed in a cylindrical tube shape, the present disclosure is not limited to this, and the shaft portion may be made to be a solid cylindrical shape that is solid. Further, the shaft portion may be shaped as a tube that, is polygonal or may be shaped as a pillar that is solid and whose cross-section is polygonal. In this case, the direction orthogonal to the axial direction of the shall portion is the radial direction of the shaft portion.

Further, the above-described embodiment is a structure in which the cut-out portions 34 that serve as weak portions are formed in all of the four ribs 52 that the built-in supporting pillar 24 has. However, the present disclosure is not limited to this. For example, there may be a structure in which weak portions are formed in only two or three of the four ribs 32. Due thereto, at the time of input of a large load to the fuel tank 10, the built-in supporting pillar 24 can be made to buckle in a desired direction.

Moreover, the above-described embodiment is a structure in which the tank main body 12 and the built-in supporting pillar 24 are made of resin, but the present disclosure is not limited to this. There may be a structure in which at least one of the tank main body 12 and the built-in supporting pillar 24 is formed of metal.

In addition, the present disclosure can be implemented by being modified in various ways within a scope that does not depart from the gist thereof. Further, the scope of the right of the present disclosure is, of course, not to be limited to the above-described embodiment.

What is claimed is:

1. A fuel tank comprising:
   a tank main body that stores fuel at an interior and has a pair of wall portions that face one another; and
   a supporting pillar that spans between the pair of wall portions,
   wherein the supporting pillar includes
   a shaft portion that is disposed with an axial direction thereof being a direction in which the pair of wall portions face one another,
   a pair of flange portions that extend-out toward a radial direction outer side of the shaft portion from the axial direction on both end portions of the shaft portion, and that are joined to the pair of wall portions, and
   a plurality of ribs that are formed at a periphery of the shaft portion, and that span between the shaft portion and the pair of flange portions, and that have weak portions that are weakened locally.

2. The fuel tank of claim 1, wherein the weak portions are cut-out portions that are formed by portions of the ribs being recessed locally toward the shaft portion side.

3. The fuel tank of claim 2, wherein the cut-out portions extend to an outer peripheral surface of the shaft portion.

4. The fuel tank of claim 2, wherein a dimension, in the axial direction, of the cut-out portions becomes smaller the further toward a shaft portion side.

5. The fuel tank of claim 2, wherein the weak portions are thin-walled portions formed in the ribs.

6. The fuel tank of claim 1, wherein a dimension, in a radial direction of the shaft portion, of the ribs becomes smaller the further toward a weak portion side from the pair of flange portions.

7. The fuel tank of claim 1, wherein one side of the ribs and another side of the ribs are formed so as to be separate in the axial direction of the shaft portion.

8. The fuel tank of claim 1, wherein the weak portions are holes that are formed in the ribs.

* * * * *